(12) United States Patent
Calderone et al.

(10) Patent No.: US 10,526,239 B2
(45) Date of Patent: Jan. 7, 2020

(54) PURIFIED QUARTZ POWDER MODIFIED FOR CLADDING OPTIC FIBER CABLE

(71) Applicant: Unimin Corporation, New Canaan, CT (US)

(72) Inventors: Paul Calderone, Mars Hill, NC (US);
Brian Mosher, Asheville, NC (US);
Chris Capobianco, Asheville, NC (US)

(73) Assignee: SIBELCO NORTH AMERICA, INC., Charlotte, NC (US)

( * ) Notice: Subject to any disclaimer, the term of this patent is extended or adjusted under 35 U.S.C. 154(b) by 0 days.

(21) Appl. No.: 15/943,262

(22) Filed: Apr. 2, 2018

(65) Prior Publication Data

US 2018/0222792 A1 Aug. 9, 2018

Related U.S. Application Data

(63) Continuation of application No. 15/274,468, filed on Sep. 23, 2016, now abandoned.
(Continued)

(51) Int. Cl.
*C03C 3/06* (2006.01)
*C03C 13/04* (2006.01)
(Continued)

(52) U.S. Cl.
CPC ........ *C03C 13/045* (2013.01); *C03C 23/0095* (2013.01); *C03C 25/007* (2013.01); *C03C 25/1068* (2018.01); *C04B 35/14* (2013.01); *C04B 35/62805* (2013.01); *C04B 35/62813* (2013.01); *C03C 2213/00* (2013.01); *C04B 2235/3203* (2013.01); *C04B 2235/3217* (2013.01); *C04B 2235/3418* (2013.01);
(Continued)

(58) Field of Classification Search
CPC . C03C 13/045; C03C 25/1068; C03C 25/007; C03C 23/0095; C04B 35/14; C04B 2235/96; C04B 2235/72; C04B 2235/3203
See application file for complete search history.

(56) References Cited

U.S. PATENT DOCUMENTS 3,394,081 A * 7/1968 King ...................... C01B 33/12
117/72
3,850,602 A * 11/1974 Bruning .................... C03C 1/02
501/54
(Continued)

FOREIGN PATENT DOCUMENTS

| CN | 1792911 A | 6/2006 |
|---|---|---|
| DE | 102008049598 A1 | 4/2010 |
| WO | 2015022562 A1 | 2/2015 |

OTHER PUBLICATIONS

International Search Report, Cited in corresponding PCT/US2016/053420, dated Dec. 2, 2016, 2 pages.
(Continued)

*Primary Examiner* — Noah S Wiese
(74) *Attorney, Agent, or Firm* — Rankin, Hill & Clark LLP

(57) ABSTRACT

A highly purified quartz powder having a low level of naturally occurring lithium modified for cladding a fiber optic cable, said modified quartz powder having an increased total amount of lithium in solid solution in said powder, said increased total amount being in the range of more than 0.50 ppm and less than 1.00 ppm and a method of modifying an highly purified quartz powder to make the same.

8 Claims, 1 Drawing Sheet

Related U.S. Application Data

(60) Provisional application No. 62/250,579, filed on Nov. 4, 2015.

(51) Int. Cl.

| | |
|---|---|
| *C03C 23/00* | (2006.01) |
| *C03C 25/007* | (2018.01) |
| *C04B 35/14* | (2006.01) |
| *C03C 25/1065* | (2018.01) |
| *C04B 35/628* | (2006.01) |

(52) U.S. Cl.
CPC .. *C04B 2235/442* (2013.01); *C04B 2235/443* (2013.01); *C04B 2235/72* (2013.01); *C04B 2235/96* (2013.01)

(56) References Cited

U.S. PATENT DOCUMENTS

| | | | |
|---|---|---|---|
| 4,414,012 A | 11/1983 | Suto et al. | |
| 4,956,059 A | 9/1990 | Englisch et al. | |
| 4,983,370 A | 1/1991 | Loritsch et al. | |
| 5,585,173 A | 12/1996 | Kamo et al. | |
| 5,637,284 A | 6/1997 | Sato et al. | |
| 5,772,714 A * | 6/1998 | Sato | C03B 5/021 65/17.3 |
| 6,235,669 B1 * | 5/2001 | Antczak | C03C 3/06 313/2.1 |
| 6,269,663 B1 | 8/2001 | Drouart et al. | |
| 2002/0166340 A1 | 11/2002 | Kemmochi et al. | |
| 2012/0103017 A1 | 5/2012 | Ludwig | |
| 2013/0125719 A1 * | 5/2013 | Kimbel | C30B 15/10 83/15 |
| 2013/0129973 A1 | 5/2013 | Kimbel et al. | |
| 2017/0341968 A1 * | 11/2017 | Schenk | C03B 19/066 |
| 2018/0052280 A1 | 2/2018 | Zhang et al. | |

OTHER PUBLICATIONS

Written Opinion of the International Searching Authority, Cited in corresponding PCT/US2016/053420, dated Dec. 2, 2016, 4 pages.

European Search Report, Cited in corresponding EP 16 86 2651, dated May 22, 2019, 2 pgs.

Espacenet Bibliographic data: DE 102008049598 (A1), Published Apr. 1, 2010, 1 pg.

Espacenet Bibliographic data: CN 1792911 (A), Published Jun. 28, 2006, 1 pg.

\* cited by examiner

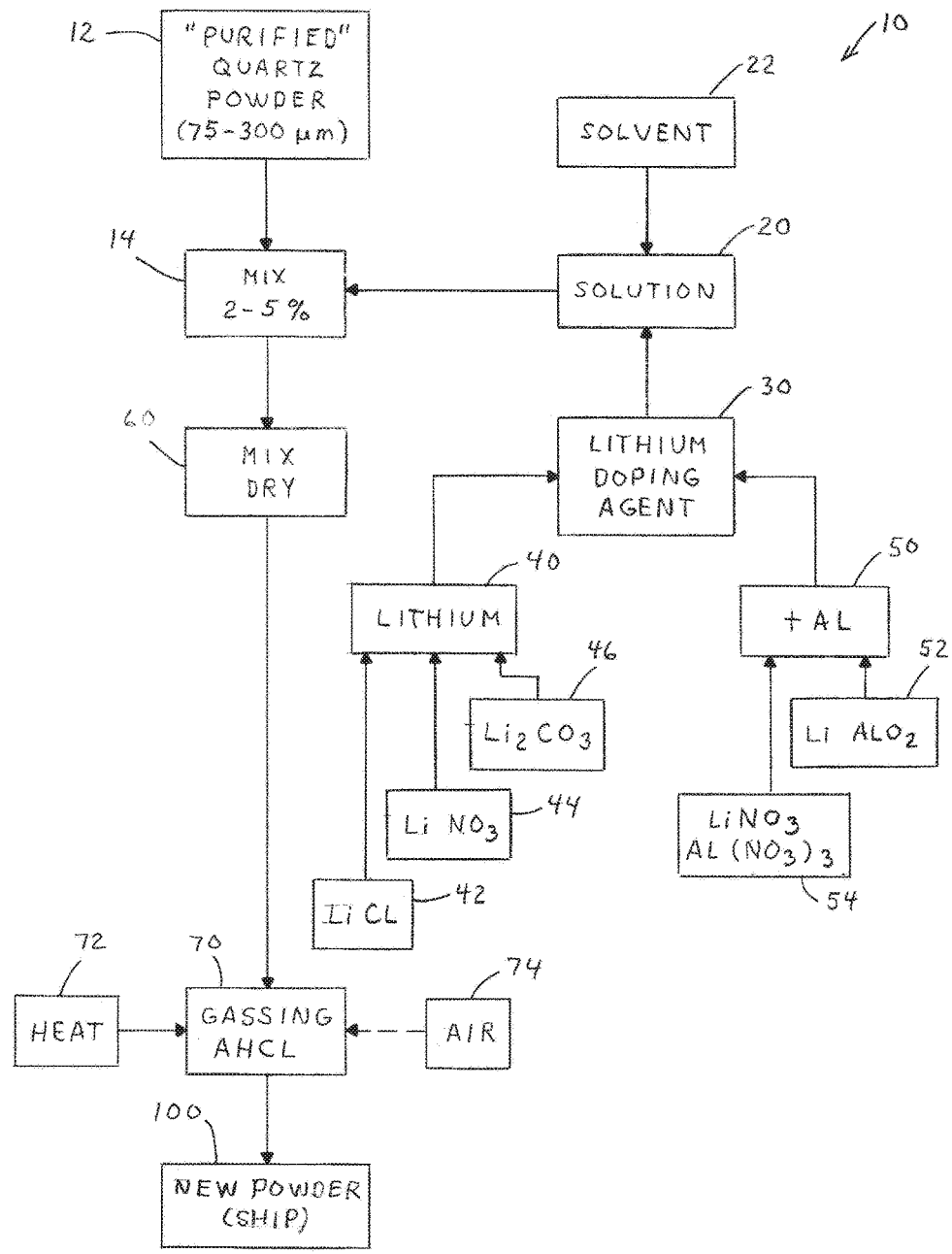

PURIFIED QUARTZ POWDER MODIFIED FOR CLADDING OPTIC FIBER CABLE

The present application is a continuation application of U.S. Ser. No. 15/274,468 filed Sep. 23, 2016 (still pending) (UNM-40285.01), which claims priority to provisional patent application Ser. No. 62/250,579 filed on Nov. 4, 2015 which is incorporated by reference herein.

The present invention relates to the highly purified natural quartz powder industry and more specifically to a modification of commercially available purified quartz powder that is specifically modified for improving the cladding of optic fiber cable and the method of making this new modified highly purified quartz powder.

BACKGROUND OF THE INVENTION

In making optic fiber cable, a cladding is used around the central core for protecting and improving the operation of the optic signal passing through the cable. Significant efforts have been made to optimize the physical and operating characteristics of the cladding beyond its general purpose of protecting the core of the cable. In the past, the cladding has been made by various materials, such as quartz powder which are highly purified to drastically reduce impurities occurring in natural quartz powder. Quartz powder was employed because it was relatively inexpensive and provided great physical properties when it had an even particle size distribution and was highly purified, such as IOTA 4 powder sold by Unimin Corporation of New Cannan, Conn. Such commercially available, highly purified, naturally occurring quartz powder was physically excellent for cladding, but did not result in the best attenuation of the cladded cable. Indeed, the attenuation was greater than 0.190 dB/km, a level not generally wanted in the industry. The present invention relates to a modification of the commercially available, highly purified, quartz powder, which modification results in a quartz powder that causes vastly improved attenuation and, indeed, has a reduced attenuation at a level of less than 0.187 dB/km and preferably at a level below the targeted attenuation value of 0.184 dB/km. Consequently, by the modification of the highly purified quartz powder in accordance with the present invention, this modified powder is now not only well designed to be used in the optic fiber cable industry, but also causes cladding using the new quartz powder to have improved attenuation properties.

As background to the present invention, the highly purified quartz powder, which is the starting point of the present invention, is a powder of the type marketed by Unimin Corporation under the trademark IOTA, preferable IOTA 4 or alternatively IOTA 6, which often is made from IOTA 4. To create this background powder, the naturally occurring quartz is ground and sized into a powder typically at having about a 100 screen size and has a low level of naturally occurring lithium in solid solution, which lithium remains after the high purification process. The quartz particles of the natural silica are purified so the particles have only a minute level of natural occurring impurities. Indeed, the processing reduces the impurities combined with the $SiO_2$ particles to the lowest level commercially practical, such as less than 0.3 ppm lithium and generally about 0.2 ppm lithium. This is the background material of the present invention. This material is modified to render a "new" powder with an increased amount of lithium in solid solution, which new powder is used for the cladding of optic fiber cables. It creates an attenuation value not heretofore obtained by the commercially available highly purified quartz powder.

SUMMARY OF THE INVENTION

In accordance with the invention, commercially available, highly purified quartz powder having a low level of naturally occurring lithium is modified for cladding in the fiber optic cable art. This existing powder is pre-processed by being leached and has a particle size distribution with a maximum particle size D99 in the range of 200-400 microns and a minimal particle size D5 in the range of 50-70 microns. The highly purified quartz powder is then modified by adding a specific amount of lithium by a SOP doping process, so the powder which normally has about 0.20 ppm of solid solution lithium is modified to have a higher solid solution lithium value, which level is broadly in the range of more than 0.50 ppm and less than 1.00 ppm. In the preferred embodiment, the increased solid solution lithium level by doping is in the range of 0.6 to 0.8 ppm. Indeed, it is preferred to define the increased solid solution lithium as being about 0.60 ppm, which is defined as 0.60 ppm to less than 0.70 ppm. This preferred level of solid solution lithium in the modified, highly purified commercial quartz powder results in an attenuation of less than 0.184 dB/km, which is the targeted attenuation sought in the optic fiber cable industry. The invention reduces the attenuation of the cladding to less than about 0.187 kB/km and preferably less than 0.184 dB/km. The invention is performed by using a lithium doping solution to increase the ultimate solid solution level of lithium in the new powder.

This preferred modification of the existing commercial quartz powder has been tested and it was determined that a small increase in aluminum in the lithium doping agent increased the level of lithium in the solid solution added to the commercial quartz powder by doping. Lesser amounts of lithium were lost while doping the new powder when aluminum was in the doping solution. Thus, in a secondary aspect of the invention, the new quartz powder uses a lithium doping solution with aluminum.

In accordance with another aspect of the present invention, there is provide a method of modifying highly purified quartz powder constituting the basic aspect of the present invention defined above. In accordance with this method, commercially available highly purified quartz powder with a small particle size and a low level of naturally occurring lithium is provided as the starting particle mass. A solution of lithium doping agent is formulated. The particle mass of commercial powder is then blended with the lithium doping solution for a time and by a vigorous mixing action to produce a homogeneous distribution of the doping agent in the quartz powder. Blending creates a mass of particles with a moisture content in the range of 2 to 5 percent. The blended powder is thereafter dried at a high temperature to provide a "given amount" of lithium in the quartz powder, which given amount is the original solid solution natural lithium and the lithium doping solution coated on the quartz powder. In the broadest aspect, the total given amount of lithium associated with the blended powder is in the range of 0.80 to 2.00 ppm, but preferably it is in the range 0.80 to 1.0 ppm. This given amount of lithium in the blended powder is a combination of the original lithium, usually about 0.20 ppm, and the lithium added by the doping solution. In summary, the first aspect of the novel method is to coat the commercial quartz powder with a small amount of lithium from a lithium doping solution to bring the lithium content to a higher level, which higher level is less than 2.0 ppm and preferably 1.0 ppm or less.

As so far described, the novel method involves coating, by a blending action, commercial quartz particles with a defined additional amount of lithium. This lithium increase is accomplished by subjecting the powders to a solution of a lithium doping agent and blending the powder and solution into the homogeneous mass. Thereafter, the blended particles and lithium solution are gassed with a gas heated to a temperature of at least 1,000° C. for a time to dope the commercial powder with the added lithium introduced at the blending operation. The hot gassing operation is controlled by temperature and time so a portion of the lithium coated on the particles, after the powder is mixed with the lithium doping solution, is converted by doping to solid solution lithium in the quartz powder Only a part of the lithium in the blended powder is doped into the original powder to create the new modified powder. This action created a solid solution level of lithium in the final powder having the range of more than 0.50 ppm, but less than 1.0 ppm. Broadly, attenuation is less than 0.187 dB/km for the modified powder, the preferred embodiment causes attenuation of less than the targeted amount in the industry, which is 0.184 dB/km. In other words, broadly stated, the invention is used to produce a drastically reduced attenuation value, which reduced value in the preferred embodiment, is less than the targeted amount of attenuation desired in the optic fiber cable industry. Consequently, the inventive modification of the quartz powder makes the new powder substantially better than the prior art for cladding.

The method of the present invention is defined above; however, certain further limitations have been created such as the concept of passing the mass of particles through a gassing chamber for a distance, such as 10 feet, to control the gassing time. In practice, the gassing chamber is horizontal; however, it can be vertical. Furthermore, the hot gas is preferably AHCl, but can be AqHCl.

In accordance with the invention, the amount of lithium coated onto the provided quartz powder brings the total lithium of the powder blend into the range of 0.80 to 2.0 ppm and preferably into the range of 0.80 to 1.0 ppm. Even though the broadest aspect of the invention has a solid solution level of lithium in the final product of between 0.50 ppm and 1.00 ppm, in the preferred embodiment, the range of solid solution lithium in the final modified powder is preferably in the range of 0.6 to 0.8 ppm. As a tested, preferred powder, the solid solution level of lithium in the final powder is about 0.60 ppm. This preferred level of solid solution lithium in the final product produces the desired reduced level of attenuation when the powder is used for cladding of optic fiber cable.

In accordance with the preferred embodiment, the gassing temperature in the final gassing operation is in the range of 1200°-1300° C. and in practice has been about 1,250° C. In practice, the doping agent is normally lithium nitrate. However, lithium carbonate and lithium chloride have also been used successfully in practicing the present invention. In an embodiment using a doping agent including aluminum, the doping agent was lithium aluminate with or without being in combination with aluminum nitrate. When a combination of lithium and aluminum is used in the doping agent, the liquid or moisture percentage of the solution is selected to give a stoichiometric resolution of the components. Aluminum has been shown to increase the lithium doping action.

In accordance with another aspect of the method to produce the novel modified powder, the hot gassing operation is created by passing the blended mass of powders through a gassing chamber with a distance to control the gassing time. Thus, the lithium coated onto the particles and the low amount of lithium in the natural particles of the blended mass is converted to a total level of lithium in solid solution in the final powder, as defined above.

The gas temperature used for the final heating operation and the time the particles are subjected to the hot gas are controlled to produce a final doping action to obtain a final solid solution level of lithium in the range of at least 0.50 ppm, but less than 1.00 ppm. An adjusted level of lithium coated on the blended powder is also used to control the amount of lithium doped into the final modified powder. Not all the coated lithium is doped into the final powder so the starting level is a control factor. The highly purified quartz powder is modified to reduce the attenuation in general of fiber optic cable cladded by the new powder. In accordance with the broadest aspect of the invention relating to adding lithium, the attenuation is less than 0.187 dB/km and preferably less than 0.184 dB/km, the target level in the industry.

In summary, there is provided a previously "purified" quartz powder, which powder is modified so it has more than 0.5 ppm, but less than 1.0 ppm lithium in solid solution and preferably 0.6 to 0.8 ppm lithium in solid solution. It has been proven by tests that this increase level of lithium improves the attenuation of the optic fibers in a cable to a level below 0.184 dB/km, the sought after target level of the optic fiber industry. As is known, attenuation in a fiber optic cable is a measure of the loss of signal strength or light power that occurs as the light pulses propagate through a run of fiber. Measurements typically are defined in the terms of decibels or dB/km. By using a lithium doping solution with aluminum, it has been determined that aluminum reduces the amount of lithium lost by the hot gassing operation. More of the lithium coated on the powder is actually doped into the powder.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which forms a part hereof and wherein:

FIG. 1 is a schematic representation of the new method for making the modified quartz powder constituting the invention.

DESCRIPTION OF PREFERRED EMBODIMENTS

In accordance with the invention, there is provided method 10 used to modify a highly purified quartz powder. This method is schematically shown in the FIGURE. Processed, purified quartz powder, with the general properties of IOTA 4, preferably having a maximum particle size D99 of 200-400 microns and a minimum particle size D5 of 50-70 microns is provided at operation 12. IOTA 6 could also be the starting powder at operation 12, but it is not preferred. The purified quartz powder is a leached quartz powder which has been aggressively cleaned so only a minute amount of impurities remain in the powder. In these highly purified quartz powders, the inherent lithium content of the starting powder is low, i.e. generally about 0.20 ppm.

Though it is known that the powder is used for cladding, the invention improves the powder by drastically reducing the attenuation of the cladding. This previously purified quartz powder is directed to station 14 where it is mixed with a doping solution from station 20. At this solution station, a compound of a lithium doping agent from station 30 is combined with water or other liquid solvent from supply 22 to form a doping solution. This solution is mixed with the purified quartz powder at station 14. This is a blending operation where the quartz powder with the doping solution is aggressively blended for a time sufficient to produce a homogeneous distribution of the doping agent into the purified quartz powder to coat the powder evenly with the doping solution. Consequently, the purified quartz is coated with a selected amount of lithium doping solution to give a total lithium content of the powder in the general range of 0.80 to 2.0 ppm and preferably in the range of 0.80 to 1.0 ppm. This range has an effect on the final level of doped lithium in the modified powder.

In practice this selected doping agent or compound for station 30 is preferably a lithium agent from station 40, such as LiCl provided by supply 42, $LiNO_3$ provided by supply 44 or $Li_2CO_3$ provided by supply 46. Tests indicate that lithium nitrate from supply 44 is preferred. In an alternative, quartz powder 12 is not only coated with a lithium doping agent, but also a lithium agent combined with an aluminum doping agent or compound from station 50. To accomplish this alternative, a doping compound with aluminum is provided from station 20 to station 14. If aluminum doping agent is selected for method 10, either $LiAlO_2$ provided by the doping agent is supply 52 or $Al(NO_3)_3$ and the preferred $LiNO_3$ provided by supply 54. One of these aluminum doping agents is provided to station 20 from station 30 to make a solution for dual doping of lithium and aluminum at station 20 for reasons previously described.

The doping solution, preferably lithium or, alternatively, lithium and aluminum is mixed at station 14 with the commercially purified quartz powder to obtain a mass of coated particles which mass has a moisture content of 2-5 percent. Other appropriate moisture contents can be used. When the aluminum doping agent at station 50 from either supply 52 or supply 54 is employed, the solution at station 20 must include more liquid so that the solution is a stoichiometric resolution of aluminum and lithium.

Station 14 mixes the doping solution from station 20 to give a blended mass. In practice, the blending action is by dripping the solution into a tumbling cone blender operated at a batch mode for a time to create a homogeneous mass of moist particles as previously described. This operation generally requires at least 1.0 hour. The time may be effected by the percentage of doping solution. It is necessary for the thorough blending at station 14 to produce a specific blended mass with a level of lithium on the surface of the quartz particles, which particles, after prior purification, already had a standard low level of naturally occurring lithium, i.e. less than 0.3 ppm and normally about 0.2 ppm. The amount of lithium coated onto the powder brings the total level of lithium in the blended mass to a level in the range of 0.80 to 2.0 ppm and preferably to a level in the range of 0.80 to 1.0 ppm. The selected level is used to control the final level of lithium in the final powder. Now the commercially available purified quartz powder having a particle size distribution PSD of 50 to 400 microns is evenly coated with the desired amount, or controlled amount, of lithium. The blended mass has a total lithium level, with about 0.2 ppm in solid solution and the rest coated onto the particles.

The moist, homogeneously mixed quartz powdered particles or blended mass from station 14 is mixed and dried in a vacuum dryer 60 operated at a high temperature of at least about 80°-100° C. for a time of at least about 1.0 hour. In this manner, the quartz particles of the blended mass are dried and the doping compound is structurally associated with the surface of the quartz powder. Now the coated powder or blended mass is passed through a continuous hot gassing operation 70 (doping operation), which operation is performed in a rotary tube reactor surrounded by a furnace having a temperature preferably 1,200°-1,300° C. controlled by heating step 72. The rotatory reactor has an effective length of about 10 feet, which gives a heating time of about 45 minutes. Gassing or doping station 70 directs the heated gas over the moving particles. In practice, the speed of the moving particles is about 1 pound/minute. The hot gassing operation is performed preferably by AHCl heated to a high temperature. Doping of the lithium, with or without aluminum, is caused by the gassing operation 70, with or without providing air from supply 74. The air is optional and helps retain the level of doping content, especially when aluminum is employed as one of the doping compounds. As an alternative, an AqHCl liquid gassing operation is performed by reactor 70. This option is employed especially when aluminum addition is being used. Thus, the quartz particles are doped by the high temperature gassing. Consequently, the doped quartz powder, after hot gassing has an increased amount of lithium in solid solution in the quartz particles forming the original powder of the blended mass. The increased lithium in solid solution is by the portion of lithium doped into the particles from the solution coated on the particles. The doped level is controlled at gassing operation 70 and is affected by temperature, time and amount of lithium coated on the particles. The doped quartz is a new powder collected and then shipped from the site of method 10 as indicated by station or operation 100.

As indicated in the drawing and discussed in the following section regarding examples, several doping agents have been identified and tested for "adding" lithium to highly purified quartz powder having a naturally existing lithium level of about 0.2 ppm or less. Lithium nitrate (supply 44) was found to be the preferred doping agent due to its high solubility in water at station 20 and its superior results when used in method 10. Furthermore, it was discovered that when lithium nitrate is the selected doping agent, standard doping protocol was successfully employed to add the desired amount of lithium to the highly purified quartz powder.

EXAMPLES

Extensive testing was conducted by producing a blend of highly purified quartz powder, such as IOTA 4, with lithium of about 0.2 ppm in solid solution in the quartz powder and a solution of a lithium doping agent to obtain a given, increased amount of lithium in the known powder. Lithium nitrate is preferred and used in the first two examples. The targeted increased level of solid solution lithium from the doping action at station 70 was 0.60 ppm. This laboratory testing suggested that increased lithium level carried by the existing quartz powder by way of the doping solution coating should be 1.0 ppm. The powder with this coated lithium level was blended at operation 14 and then gassed with AHCl at operation 70. As indicated, this action was designed to yield a desired 0.6 ppm lithium level in solid solution for the final powder. This targeted level is near the lower level of the invention. However, the lithium in solid solution in this process was actually about 0.80 ppm, instead of 0.60. The initial tests indicated that using air did not have an effect on the lithium doped into the original powder. This testing was with gassing by AHCl at 1250° C. for 45 minutes. This first example with a solid solution content of about 0.80 ppm was found to be successful in improving attenuation of quartz powder. The attenuation was below 0.187 dB/km. This attenuation was not obtained by commercially available purified quartz powder of the type modified in the invention. Attenuation of the prior powder was over 0.190 dB/km. However, this first example exceeded the originally targeted level of 0.60 ppm in solid solution. It was about 0.823 ppm. Consequently, this first test example was used to define the general upper limit for lithium doping in accordance with the objective of invention. Example 2 was then produced in an effort to obtain a better powder with a solid solution of lithium closer to the targeted level of added lithium, i.e. 0.60 ppm. The first example seeking the targeted 0.60 ppm level had merely reduced the lithium level in the blended powder by 0.2 ppm when the powder was doped at operation 70. Using this fact to produce the powder of Example 2, with a solid solution level nearer the targeted value of the invention, the initial level of the total lithium in the blended powder from operation 14 was adjusted to a lower starting value of 0.85 ppm lithium. The coated level of lithium was reduced to a level less than 0.10 ppm. With gassing by AHCl at the 1250° C. temperature for 45 minutes, as used in Example 1, Example 2 is a new powder with the solid solution lithium level of about 0.65 ppm (actually 0.665 ppm). This is close to the targeted level of 0.60 ppm. So both Examples 1 and 2 created a quartz powder for use in cladding optic fiber cable, which new quartz powder is acceptable to the fiber optics industry and had a reduced attenuation, the objective of this invention. Example 1 is near the highest final level of lithium in solid solution and Example 2 is near the lower, but preferred level of lithium in solid solution in the final powder. Both examples reduced attenuation when used as cladding of an optic fiber cable.

Since the two powders with increased lithium doped into the powder were both acceptable as an improved quartz powder for use as cladding of an optic fiber cable, they defined the final solid solution lithium level limitations of the invention. Example 1 was a little over 0.80 ppm and Example 2 was about 0.60 ppm. From these successful examples of improved quartz powders using the invention, the invention is broadly defined as adding solid solution lithium to high purity quartz powder to obtain a final level of lithium in solid solution at a value of more than 0.50 ppm and less than 0.10 ppm, but preferable the tested levels of doped lithium is 0.6 to 0.8 ppm. More preferably a solid solution lithium level is about 0.60 ppm.

Example 1

The blended mass of powder had 1 ppm lithium and was gassed by AHCl at 1250° C. to give a solid solution lithium level in the final product of 0.823 ppm. The attenuation was reduced to a level below 0.187 dB/km.

Example 2

The blended mass of powder had 0.83 ppm lithium and was gassed by AHCl at 1250° C. to give a solid solution lithium level in the final product of 0.665, which conforms to the desired targeted level. Example 2 was tested and found the attenuation was 0.183 dB/km. This constitutes the primary object of the invention to decrease the attenuation by using high lithium and preferably an attenuation level less than 0.184 dB/km.

Broadly the added lithium of the invention is an improvement because it reduces the attenuation obtained when purified quartz is used as cladding of optic fiber cable over prior art purified quartz powder. Example 1 was acceptable for improving commercial purified quartz powder for cladding. However, Example 1 was determined to be near the upper limit of the solid solution level to accomplish the inventive improvement of purified quartz powder for the fiber optic industry. Example 2 was preferred because it reduced the lower attenuation of the invention to a much desired level.

From Example 1 and Example 2 and other tests, it was found the lithium nitrate from supply 44 was the preferred doping agent for forming the solution at station 20 to obtain the objective of the invention, i.e. increased solid solution lithium in commercial high purified quartz powder. Further examples were generated using method 10 to determine the merits of various doping agents.

Example 3

This example was formulated by suing $Li_2CO_3$ from supply 46. It was determined that if the preferred maximum amount of total lithium in the blended mass of powder from station 14, i.e. 1.0 ppm, doping by gassing 70 of method 10 resulted in the final solid solution of lithium to about 0.4 ppm which, is less than the lithium level of the present invention. Consequently, more lithium carbonate doping agent is needed to practice the invention. It is less efficient in its doping action. It was found that LiCl from supply 42 performed as Example 3. Consequently, testing to obtain the lithium level of the invention established that lithium nitrate from supply 44 is preferred, the other similar doping agents from supplies 42 and 46 required higher levels of lithium at station 14.

Example 4

After it was determined that the invention could be performed using lithium doping agents from supplies 42, 44 and 46, further alternative laboratory work was conducted to determine if aluminum could help retain the lithium level after hot gassing at station 70. In the first example $LiNO_3$ and $Al(NO_3)_3$ from supply 54 was used to make Example 4. It was found that by making a stoichiometric solution a desired 1.0 ppm lithium level for the blended mass of powder resulted in 0.4 ppm aluminum. After the blended mass of powder was gassed at 1250° C., the resulting final solid solution lithium level was "about" 0.60, i.e. it was 0.619. Consequently, Example 4 establishes that the invention could be performed with an aluminum containing doping agent, such as from supply 54. This additional of aluminum appears to increase the amount of lithium from the level in the blended powder at station 12 that was actually doped into the new, modified powder at station 70. Alternative use of aluminum is not preferred due to complexity and cost; however, it can be used to control the resulting lithium doping levels.

Example 5

Since it was determined by Example 4 that aluminum can affect lithium levels when using method 10, a test was then conducted with an aluminum doping agent, not including the preferred lithium nitrate. Lithium aluminate by itself from supply 52 was used in method 10. It has been was established that aluminum could increase the lithium from the level at station 14 doped into the powder. Consequently, next Example 5 started with a reduced original level of lithium at station 14. In this test, lithium was reduced from 0.10 ppm to a level of 0.6 ppm, i.e. the desired final doped solid solution level after hot gassing. The test was to determine the ability of aluminum in the doping solution to increase the solid solution level of lithium after the hot gassing. A first version of Example 5 merely heated the described blend from station 14. It was found that heating did not substantially change the lithium level, but the lithium was still merely at the level coated on the original powder. Then the doping process of method 10 was fully performed to make the second version of Example 5. In this version, the level of lithium in the blended mass of powder from station 14 after the hot gassing or doping operation was generally reduced from the undoped level 0.60 ppm to the doped solid solution level 0.40 ppm. The small decrease in total lithium from 0.60 to 0.40 in the final product does establish the fact that aluminum helps retain the lithium level during the doping process, but it is only an alternative to the preferred embodiments made preferably from doping agent from supply 44. Examples 4 and 5 using supplies 54 and 52 respectively confirms same benefit to using aluminum in the doping solution 20. However, this concept is an alternative in practicing the invention because of various factors explained above.

In summary, samples with added lithium obtained solid solution lithium levels in the range about 0.50 to 1.00 ppm. Such modified powder has been shown to reduce attenuation caused by cladding. This attenuation reduction is the objective of the invention. It was determined that the lower level of added lithium in solid solution, i.e. more than 0.50 ppm, is needed to obtain the desired reduced attenuation. The upper level of added lithium in solid solution, i.e. less than 1.00 ppm, was the value selected by research and development team. to prevent a higher level of lithium that adversely affects other properties when using the new powder for cladding.

SUMMARY

A new quartz powder with a particle size distribution PSD of 70-400 microns, which powder has been previously "purified", as this term is used in the industry, is modified. This new "purified" powder has broadly more than 0.50 ppm, but less than 1.00 ppm of lithium (0.50 to 1.00 ppm) in solid solution. Preferably, the solid solution lithium level is 0.60-0.80 ppm or more preferably the level is about 0.60 ppm.

This new modified powder involves doping a previously purified quartz power with a limited controlled level of lithium. Such new method 10 is shown in the FIGURE. This new method is preferably performed by adding a solution of lithium doping agent to the previously purified quartz powder. The soaked powder is aggressively agitated into a homogeneous mass and then this blended mass is dried. The dry mass of particles coated with lithium are gassed by a counter-current, high temperature (1,200-1,300° C.) procedure with a gas, such as AHCl. Additional lithium is doped into the purified quartz powder to make a "new" quartz powder for use in cladding to reduce attenuation. The total amount of lithium in the final modified powder is determined by the amount of lithium in the solution coated onto the powder that is actually "doped" into the particles. This doped amount is always less than the lithium originally coated onto the blended mass at station 14. The desired results are to employ standard doping at station 70 to give an increase in the lithium in solid solution in the quartz powder.

Unimin has developed (invented) an available small grain quartz powder to reduce attenuation when the quartz powder is used for cladding of fiber optics. The new powder is uniquely modifying previously purified quartz powder. In summary, the invention is a new powder modified to reduce attenuation obtained by prior use of purified quartz powder. The appended claims are also a part of the disclosure of the invention herein described.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

It is claimed:

1. A method of modifying a highly purified quartz powder having low level of naturally occurring lithium for use in cladding a fiber optic cable, said method comprising:
    a) forming a solution of a lithium doping agent;
    b) blending said highly purified quartz powder with said doping solution to provide a blended mass with a given level of lithium comprising lithium of said doping solution coated onto said highly purified quartz powder and the low level of naturally occurring lithium of said highly purified quartz powder, said blended mass having a moisture content of 2-5 percent;
    c) gassing said blended mass with a gas heated to a temperature of at least 1000° C. for a time to dope said highly purified powder with lithium in said doping solution; and,
    d) controlling the amount of lithium from said doping solution that is doped into said highly purified quartz powder so the total lithium in solid solution in said modified highly purified quartz powder is at a final level of 0.50-1.00 ppm.

2. A method of modifying a highly purified quartz powder having a low level of naturally occurring lithium for use in cladding a fiber optic cable, said method comprising:
    a) forming a solution of a lithium doping agent, which agent is a lithium salt, said salt being $LiNO_3$;
    b) blending said highly purified quartz powder with said doping solution to provide a blended mass with a given level of lithium comprising lithium of said doping solution coated onto said highly purified quartz powder and the low level of naturally occurring lithium of said highly purified quartz powder;
    c) gassing said blended mass with a gas heated to a temperature of at least 1000° C. for a time to dope said highly purified powder with lithium in said doping solution; and,
    d) controlling the amount of lithium from said doping solution that is doped into said highly purified quartz powder so the total lithium in solid solution in said modified highly purified quartz powder is at a final level of 0.50-1.00 ppm.

3. A method of modifying a highly purified quartz powder having a low level of naturally occurring lithium for use in cladding a fiber optic cable, said method comprising:

a) forming a solution of a lithium doping agent, wherein said doping agent includes aluminum to increase the portion of lithium from said blended mass converted to solid solution doped into said highly purified powder during said gassing operation, said agent being $LiAlO_2$;
b) blending said highly purified quartz powder with said doping solution to provide a blended mass with a given level of lithium comprising lithium of said doping coated onto said highly purified quartz and the low level of naturally occurring lithium of said highly purified quartz powder;
c) gassing said blended mass with a gas heated to a temperature of at least 1000° C. for a time to dope said highly purified powder with lithium in said doping solution; and,
d) controlling the amount of lithium from said doping solution that is doped into said highly purified quartz powder so the total lithium in solid solution in said modified highly purified quartz powder is at a final level of 0.50-1.00 ppm.

4. A method of modifying a highly purified quartz powder having a low level of naturally occurring lithium for use in cladding a fiber optic cable, said method comprising:
a) forming a solution of a lithium doping agent, wherein the doping agent includes aluminum to increase the portion of lithium from said blended mass converted to solid solution doped into said highly purified powder during said gassing operation, wherein said doping agent is a lithium salt combined with aluminum salt, said agent being $Al(NO)_3$;
b) blending said highly purified quartz powder with said doping solution to provide a blended mass with a given level of lithium comprising lithium of said doping solution coated onto said highly purified quartz powder and the low level of naturally occurring lithium of said highly purified quartz powder;
c) gassing said blended mass with a gas heated to a temperature of at least 1000° C. for a time to dope said highly purified powder with lithium in said doping solution; and,
d) controlling the amount of lithium from said doping solution that is doped into said highly purified quartz powder so the total lithium in solid solution in said modified highly purified quartz powder is at a final level of 0.50-1.00 ppm.

5. A method of modifying a highly purified quartz powder having a low level of naturally occurring lithium for use in cladding a fiber optic cable, said method comprising:
a) forming a solution of a lithium doping agent;
b) blending said highly purified quartz powder with said doping solution to provide a blended mass with given level of lithium comprising lithium of said doping solution coated onto said highly purified quartz powder and the low level of naturally occurring lithium of said highly purified quartz powder and said given level of lithium being in the range of 0.80 to 2.0 ppm;
c) gassing said blended mass with a gas heated to a temperature of at least 1000° C. for a time to dope said highly purified powder with lithium in said doping solution; and,
d) controlling the amount of lithium from said doping solution that is doped into said highly purified quartz powder so the total lithium in solid solution in said modified highly purified quartz powder so the total lithium in solid solution in said modified highly purified quartz is increased to a final level of 0.60 to 1.00 ppm.

6. A method of modifying commercially available highly purified quartz powder having a low level of naturally occurring lithium for use in cladding a fiber optic cable, said method comprising:
a) forming a solution of a lithium doping agent;
b) blending said commercially available highly purified quartz powder with said doping solution to provide a blended mass with a given level of lithium comprising lithium of said doping solution coated onto said highly purified quartz powder and the low level of naturally occurring lithium of said highly purified quartz powder and said given level being in the range of 0.80 to 2.0 ppm;
c) gassing said blended mass with a gas heated to a temperature of at least 1000° C. for a time to dope said commercially available highly purified powder with lithium in said doping solution; and,
d) controlling the amount of lithium from said doping solution that is doped into said commercially available highly purified quartz powder so the total lithium in solid solution in said modified commercially available highly purified quartz powder is increased to final level 0.60-1.00 ppm.

7. The method as defined in claim 6 wherein said lithium doping agent is a lithium salt.

8. The method as defined in claim 6 wherein said lithium doping agent includes aluminum.

* * * * *